United States Patent [19]

Watanabe

[11] Patent Number: 4,600,245
[45] Date of Patent: Jul. 15, 1986

[54] LIQUID PRESSURE CONTROL DEVICE FOR ANTI-LOCK BRAKE SYSTEM

[75] Inventor: Mamoru Watanabe, Tokyo, Japan

[73] Assignee: Watanabe Engineering Kabushikigaisha, Tokyo, Japan

[21] Appl. No.: 721,587

[22] Filed: Apr. 10, 1985

[30] Foreign Application Priority Data

Apr. 16, 1984 [JP] Japan .................. 59-76314

[51] Int. Cl.⁴ .............................. B60T 8/06
[52] U.S. Cl. .................. 303/115; 303/114; 303/119
[58] Field of Search ............ 188/181 A; 303/113, 303/114, 115, 116, 117, 119

[56] References Cited

U.S. PATENT DOCUMENTS

| | | | |
|---|---|---|---|
| 2,868,338 | 1/1959 | Lucien et al. | 188/181 A |
| 4,017,126 | 4/1977 | Ohta | 303/115 |
| 4,422,695 | 12/1983 | Farr | 303/115 |

*Primary Examiner*—Duane A. Reger
*Attorney, Agent, or Firm*—Collard, Roe & Galgano

[57] ABSTRACT

A liquid pressure control device for an anti-lock brake system is provided. The device includes a control valve which intermittently interrupts the liquid pressure feed from a master cylinder to a wheel cylinder, a liquid pressure control piston which moves in such a manner as to control the liquid pressure to the wheel cylinder, a differential pressure-responding member which closes the control valve and moves the liquid pressure control piston in conjunction with its forward motion, a stopper arranged engageably with the differential pressure-responding member located in its initial position, and a gas pressure chamber and liquid chamber, which produce the pressure difference acting on the differential pressure-responding member. The gas pressure chamber is charged with gas, the gas pressure of which is used to return the differential pressure-responding member to its initial position during the non-braking and normal braking condition, while the liquid chamber receives an input of controlling liquid pressure which acts against the gas pressure in the gas pressure chamber during the anti-lock action, so as to make the differential pressure-responding member shift forwards. During non-braking and normal braking conditions, the stopper is engaged with the differential pressure-responding member to inhibit its forward motion and disengaged therefrom during the anti-lock action, so as to allow its forward motion.

8 Claims, 2 Drawing Figures

LIQUID PRESSURE CONTROL DEVICE FOR ANTI-LOCK BRAKE SYSTEM

BACKGROUND OF THE INVENTION

1. Field of the Invention

The present invention relates to an improvement in a liquid pressure control device for an anti-lock brake system, which is used as the braking apparatus for automobiles and other vehicles.

2. Description of the Prior Art

When the braking force applied to the automobile tires exceeds their road contact frictional force, the so-called brake lock phenomenon occurs, resulting in a loss of directional stability and an increase in the necessary braking distance. To avoid this phenomenon, it has been proposed to use a liquid pressure control device for an anti-lock brake system constructed with a control valve and a liquid pressure control piston. The control valve serves to interrupt the excessive liquid pressure in the braking circuit between the master cylinder and wheel cylinders. The liquid pressure control piston acts in conjunction with the control valve so as to control the liquid pressure to be fed to the wheel cylinders wherein the above mentioned liquid pressure control piston is actuated by a device which detects the rotating status of the wheels in such a manner that the liquid feed is interrupted just before the brakes lock and controlled to achieve the anti-locking effect. Such a construction is described, for example, in Japanese Laid Open Patent Application No. 48-96993. However, this construction has the disadvantage that the liquid pressure control piston can mis-function and the interruption by the control valve between the master cylinder and wheel cylinders can take place even if there is no brake lock phenomenon. Moreover, when the above-mentioned control valve is unexpectedly closed on the assembly line or during automobile repairs, a bleeding operation, in which air in the braking circuit is purged and brake liquid is charged, becomes difficult.

SUMMARY OF THE INVENTION

It is an object of the present invention to provide a liquid pressure control device for an anti-lock brake system which is not subject to any mis-function of the control valve or liquid pressure control piston and can guarantee correct braking action when required.

It is another object of the present invention to provide a liquid pressure control device for an anti-lock brake system which can simplify the task of pressure bleeding.

It is another object of the present invention to provide a fail-safe liquid pressure control device for an anti-lock brake system.

The above objects are accomplished in accordance with the present invention by providing a liquid pressure control device comprising control valve means to intermittently interrupt the feed of liquid pressure from the master cylinder means to the wheel cylinder means; a liquid pressure control piston which shifts to control the liquid pressure to be fed to the wheel cylinder means; a differential pressure-responding member to close the control valve means and make the liquid pressure control piston move, according to its forward motion; a gas-filled pressure chamber which accumulates gas pressure so as to return the differential pressure-responding member to its initial position during non-braking and normal braking conditions; a chamber of liquid which produces a controlling liquid pressure to make the differential pressure-responding member move forward against the pressure in the gas chamber during the anti-lock action; an on-off valve means to apply controlling liquid pressure to the liquid chamber during anti-lock actions and dissipate the controlling liquid pressure during non-braking and normal braking conditions; a stopper arranged engageably to the differential pressure-responding member located in its initial position; and an engagement control means which engages the stopper with the differential pressure-responding member so as to hold the differential pressure-responding member in its initial position during non-braking and normal braking conditions, while disengaging the stopper from the differential pressure-responding member during anti-lock actions so as to allow the latter to have forward motion. In this apparatus, the said differential pressure-responding member is kept in its initial position by means of its engagement with the stopper, even if there is some gas leakage from the gas pressure chamber or an abnormally high liquid pressure in the liquid chamber during non-braking and normal braking conditions. Therefore, the control valve means can be kept in an open position, ensuring perfect braking action. Moreover, when the controlling liquid pressure in the liquid chamber dissipates for some reason such as engine stopping during the anti-locking action, the gas pressure in the gas chamber returns the differential pressure-responding member to its initial position, so the control valve means can be opened to ensure braking. Therefore, it is expected that high failproof performance will result. Furthermore, the brake fluid can be fed under pressure without undertaking the troublesome air-purging procedure, if the pressure bleeding operation charging the brake liquid to the braking circuit on assembly or repair work is carried out while the said pressure-responding member is engaged with the stopper.

BRIEF DESCRIPTION OF THE DRAWINGS

Other objects and features of the present invention will become apparent from the following detailed description considered in connection with the accompanying drawings. It is to be understood, however, that the drawings are designed as an illustration only and not as a definition of the limits of the invention.

In the drawings wherein similar reference characters denote similar elements throughout the several views.

DETAILED DESCRIPTION OF THE PREFERRED EMBODIMENTS

Figure 1:
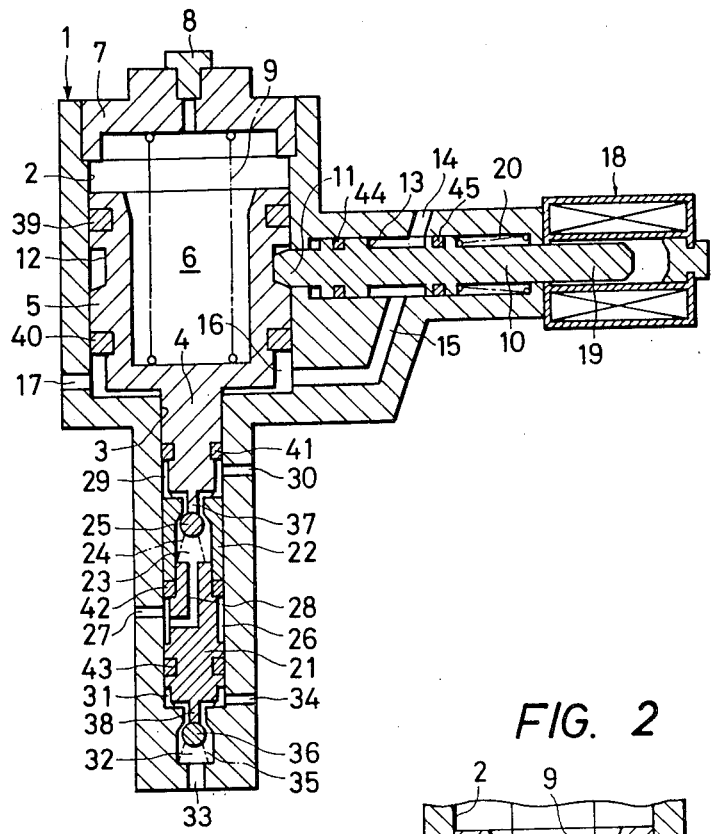
FIG. 1 is a cross-sectional view of a first embodiment according to the present invention.

Now turning to the drawings, there is shown in FIG. 1 a differential pressure-responding cylinder 2, and a liquid pressure control cylinder 3 provided in the liquid pressure control device 1 for an anti-lock brake system, wherein a differential pressure-responding member 5 integrated with a liquid pressure control piston 4 is movably attached. The differential pressure-responding member 5 has a pressure supporting surface area greater than that of the liquid pressure control piston 4.

Above the differential pressure-responding member 5, there is provision for a gas pressure chamber 6, wherein an inert gas is sealed through a head plug 7 provided with a gas pressure detection device 8. The differential pressure-responding member 5 is pushed downwards by the above-mentioned gas pressure and a compression spring 9. The surrounding side surface of the differential pressure-responding member 5 is provided with a concave part 12 which engages with a stopper 11 at the inner edge of a valve plunger 10. The contact area between the stopper 11 and the concave part 12 is tapered, assuring easy engagement and disengagement of both parts.

A spool valve 13 in the middle of valve plunger 10 intermittently interrupts liquid flowing through passages 14 and 15.

Passage 14 is connected with a reservoir (not shown) in the power steering device, while passage 15 is connected to a driving pump (not shown) through a liquid chamber 16 and another passage 17. An outer edge of the valve plunger 10 has a rod part 19, which is driven left or right with the valve plunger 10 when a linear motor 18 is actuated. When the linear motor 18 is not operating, the valve plunger 10 is forced to the position shown by spring action. A linear motor, such as linear motor 18, which is actuated just before wheel lock during braking is already well known.

Under the liquid pressure control piston 4, a floating piston 21 is movably incorporated within the liquid pressure control cylinder 3 so that liquid pressure for two different brake systems can be controlled at the same time. The floating piston 21 is integrated in a valve case 22, wherein a first control valve 25 is positioned in a first valve chamber 23 so as to be forced to close by a spring 24.

A liquid chamber 26 at the side of the floating piston 21 is connected with one output device (not shown) of the tandem master cylinder through the first input hole 27, while a passage 28 connects with the wheel cylinders (not shown) through the first valve chamber 23, the first liquid pressure control chamber 29 and the first output hole 30.

Beneath the floating piston 21, there is a second liquid pressure control chamber 31, which is connected to another output device (not shown) of the above-mentioned tandem master cylinder through a second valve chamber 32 and a second input hole 33 and, further, with the above-mentioned wheel cylinders (not shown) through a second output hole 34. A second control valve 36 is positioned in the second valve chamber 32 so as to be forced to close by the action of a spring 35. The first and second control valves, 25 and 36, are pushed downwards and opened by the corresponding pins 37 and 38, respectively. The gas and liquid pressure seals are indicated by the reference numerals 39, 40, 41, 42, 43, 44 and 45.

The operation of the control device will now be described in detail, referring to the embodiment shown in FIG. 1. During normal running conditions, linear motor 18 is inactive, valve plunger 10 is kept in the shown position by means of return spring 20 and the passages 14 and 15 are kept fully-opened by spool valve 13. Through a branch circuit of the driving pump for the power steering, liquid pressure is fed to passage 17, the said liquid pressure is fed back to the reservoir through passage 14, because the spool valve 13 is kept in the open position. No liquid pressure pushing the differential pressure-responding member 5 upwards is accumulated in the liquid chamber 16.

The differential pressure-responding member 5 and the liquid pressure control piston 4 are pushed downwards and positioned as shown by action of the gas pressure sealed in the gas pressure chamber 6 and by the compression spring 9, together with the valve case 22 kept in contact with the liquid pressure control piston 4, and the floating piston 21, which are likewise pushed downwards to the position shown. Therefore, the first and second control valves 25 and 36 are pushed downwards and opened by the corresponding pins 37 and 38, respectively, while the first input hole 27 and the first output hole 30, the second input hole 33 and the second output hole 34 are respectively kept in their connected condition. As a result, the passages from the tandem master cylinder to the wheel cylinders are maintained, and the desired braking action is determined by the driver of the automobile. Meanwhile, the gas pressure in the gas pressure chamber 6 and the compression force of the compression spring 9 are preset to a value which can counterbalance the maximum upwards force of the floating piston 21 or the liquid pressure control piston 4 through the liquid pressure produced during the braking action in the first and second liquid control chambers 29 and 31. If the gas pressure is lower than the above-mentioned preset value, a gas pressure detection device 8 is actuated to interrupt the power supply to the linear motor 18.

If the wheels are brought into brake lock condition during braking due to the liquid pressure from the tandem master cylinders through the liquid pressure control device 1 for anti-lock brake system being excessive in comparison to the frictional forces of the wheels, the linear motor 18 is activated by the power supply and the valve plunger 10 is shifted to the right. This action of the valve plunger 10 first detaches the stopper 11 from the concave part 12 of the differential pressure-responding member 5, which then becomes movable upwards. When the passages 14 and 15 are interrupted, the liquid pressures generated in the liquid chamber 16 and the first and second liquid pressure control chambers 29 and 31 shift the differential pressure-responding member 5 together with the liquid pressure control piston 4 upwards.

With the upward shift of the liquid pressure control piston 4, the floating piston 21 also becomes movable, while, at the same time, the first and second control valves 25 and 36 are closed, the connections between the first input hole 27 and the first output hole 30, the second input hole 33 and the second output hole 34 are interrupted and the capacities of the first and second liquid pressure control chambers 29 and 31 are enlarged. Therefore, the liquid pressures in the wheel cylinders connected to the first and second output holes 30 and 34 are reduced to achieve the expected anti-lock action, independent of the liquid pressure levels fed to the first and second input holes 27 and 33, respectively, from the tandem master cylinder.

This anti-lock action is halted by the return of valve plunger 10 under the action of the return spring 20 upon switching off of the power supply to the linear motor 18. Pressure in the liquid chamber 16 is released through the interconnection between passages 14 and 15 and the differential pressure-responding member 5 lowers to the position shown under the action of the gas pressure in the gas pressure chamber 6 and the action of the compression spring 9.

Repetition of the above-mentioned braking action and the anti-lock action can prevent the dangerous brake-lock phenomenon and assure stabilized braking characteristics.

Although the liquid pressure control piston 4 tends to be shifted upwards from its original position because of the liquid pressure in the first and second liquid pressure control chambers 29 and 31 resulting from liquid pressure for the braking action being fed to the respective wheel cylinders from the tandem master cylinder, in some conditions, where the preset gas pressure level in the gas pressure chamber 6 cannot be maintained for some reason, such as gas leakage or abnormally high liquid pressure being fed to the liquid chamber 16 from the driving pump or for some other reason, the engagement of the differential pressure-responding member 5 with the stopper 11 of the valve plunger 10 prevents the former from shifting upwards and inhibits the anti-lock action. Therefore, the first and second control valves 25 and 36 are both maintained in the open position and there are no ill-effects on braking.

If the liquid pressure in the liquid chamber 16 unexpectedly reduces due to the engine stopping, etc. during the anti-lock action, the gas pressure in the gas pressure chamber 6 and the compression force of the compression spring 9 pushes the differential pressure-responding member 5 downwards and failproof braking action results.

If gas leakage occurs in the gas pressure chamber 6, the gas pressure detection device 8 detects the gas leakage and prevents the supply of power to the linear motor 18 so that the braking action can be accomplished without the anti-lock action even if brake lock is likely.

If a gas leakage occurs in the gas pressure chamber 6 during the anti-lock action, the power supply to the linear motor 18 is immediately interrupted by the pressure detection device 8; the spool valve 13 connects passage 14 with passage 15, and the liquid pressure in the liquid chamber 16 is therefore released. The pressure in the liquid chamber 16, which is reduced but not lower than its lowest limit in the gas pressure chamber, and the compression force of the compression spring push the differential pressure-responding member 5 downwards. As a result, the braking action is recovered and no anti-lock action takes place, even if the brake lock is likely. Further, the pressure bleeding procedure can be carried out more easily in the absence of gas sealed in the gas pressure chamber 6 during assembly or repairs.

Figure 2:
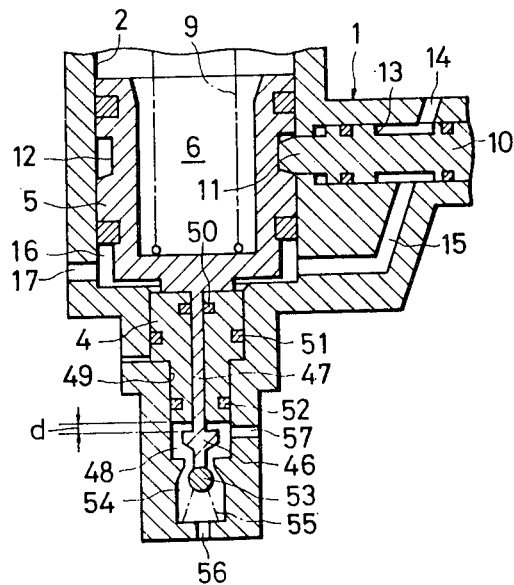
FIG. 2 is a cross-sectional view showing a second embodiment according to the present invention.

FIG. 2 is another cross-sectional view showing a modification to the embodiment in FIG. 1, where the same corresponding parts are indicated by the same numbers used in FIG. 1.

The embodiment shown in FIG. 1 is so constructed that the differential pressure-responding member 5, the liquid pressure control piston 4 and the pin 37 are operated as one unit and the liquid pressures of two brake systems can be controlled.

In the embodiment of FIG. 2, however, the differential pressure-responding member 5 and the liquid pressure control piston 4 are constructed separately and a pin 47 with a flange 46 is passed through the liquid pressure control piston 4 so that the differential pressure-responding member 5 and the pin 47 are operated as one unit and the liquid pressure of one brake system can be controlled.

The liquid pressure control piston 4 is provided with a large pressure supporting surface area at the side of the liquid chamber 16 and a small pressure supporting surface area at the side of the liquid pressure control chamber 48 and is movable inside a stepped liquid pressure control cylinder 49. The liquid chamber 16 and the liquid pressure control chamber 48 are maintained liquid-tight by seals 50, 51 and 52. A control valve 53 in a valve chamber 54 is forced to close by the action of a spring 55 and opened and closed by the pin 47. An input hole to be connected with the master cylinder (not shown) and an output hole to be connected with the wheel cylinders (not shown) are indicated by numbers 56 and 57, respectively.

Though the drive pump for driving the power steering device and other devices feeds the liquid pressure to passage 17, the valve plunger 10 being in its returned position as shown and passages 15 and 14 being open, no liquid pressure is accumulated in the liquid chamber 16 and the differential pressure-responding member 5 is pushed downwards by the gas pressure in the gas pressure chamber 6 and by the action of the compression spring 9 and maintained in its position as shown. Such a condition is maintained by the stopper 11 of the valve plunger 10 which is engaged with the concave part 12 of the differential pressure-responding member 5, even if the loss of gas pressure in the gas pressure chamber 6 or fatigue of the compression spring 9 takes place or abnormally high liquid pressure is fed to the liquid chamber 16. There is no possibility of the differential pressure-responding member 5 and the liquid pressure control piston 4 being shifted upwards and the anti-lock action being inhibited.

Thus, the brake circuit from the master cylinder through the input hole 56, the valve chamber 54, the liquid pressure control chamber 48 and the output hole 57 to the wheel cylinders are always kept in a freely-follow condition, predictable braking action is assured and, in addition, pressure bleeding operation during assembly or repairs is carried out easily.

When an anti-lock action is required during a braking action, valve plunger 10 is shifted to the right and the stopper 11 is detached from the concave part 12 and passages 14 and 15 are interrupted by spool valve 13, thus allowing the anti-lock action to operate.

Corresponding to the initial shift d in the upwards motion of the differential pressure-responding member 5 which is subjected to the liquid pressure in liquid chamber 16, the control valve 53 is first closed while the capacity of the liquid control chamber 48 is not enlarged, because the liquid pressure control piston 4 is prevented from shifting because of the liquid pressure in the liquid chamber 16. In this embodiment, the brake fluid supply from the master cylinder can be reduced by eliminating the initial shift of the liquid pressure control piston 4, which is otherwise caused by the closing action of the control valve 53 and has no effect on the anti-lock action.

When the differential pressure-responding member 5 and the pin part 47 have finished the initial shift d and the control valve 53 is closed, the flange 46 is brought into contact with the bottom part of the liquid pressure control piston 4, which is shifted upwards by the differential pressure-responding member 5 and, as a result, the capacity of the liquid pressure control chamber 48 is enlarged to start the anti-lock action. The embodiment shows the stepped configuration of the liquid pressure control cylinder 49 and the liquid pressure control piston 4. However, such stepped configuration becomes unnecessary in the presence of liquid pressure acting against the liquid pressure control chamber 48 in the liquid chamber 16.

Other reciprocating or vibrating means may be employed as alternatives to the linear motor 18. Furthermore, the first and second control valves 25 and 36 and control valve 53 are not necessarily limited to the ball valve type. The stopper 11 may be indirectly, instead of directly, engaged with the differential pressure-responding member 5 through the liquid control piston 4.

A pipe connection from the gas pressure chamber 6 to a separately-installed gas accumulating chamber may be a substitute for a sealed gas pressure chamber 6.

While only two embodiments of the present invention have been shown and described, it will be obvious that many changes and modifications may be made thereunto without departing from the spirit and scope of the invention.

What is claimed is:

1. A liquid pressure control device for an anti-lock brake system, comprising:
   (a) control valve means intermittently interrupting the liquid pressure feed from master cylinder means to wheel cylinder means;
   (b) a liquid pressure control piston which shifts to control the liquid pressure to the said wheel cylinder means;
   (c) a differential pressure-responding member which causes the closing action of the said control valve means and the movement of the said liquid pressure control piston, in response to forward motion of the differential pressure-responding member;
   (d) a gas pressure chamber charged with gas which returns the said differential pressure-responding member to its initial position during the non-braking and normal braking condition;
   (e) a liquid chamber, wherein the controlling liquid pressure acts against the gas pressure in the said gas pressure chamber during the anti-lock action, so as to make the said differential pressure-responding member move forwards;
   (f) on-off valve means which inputs the controlling liquid pressure into the liquid chamber during the anti-lock action and dissipates the controlling liquid pressure in the liquid chamber during the non-braking and normal braking condition;
   (g) a stopper arranged engageably to the said differential pressure-responding member located in its initial position; and
   (h) engagement control means, which maintains the differential pressure-responding member in its initial position by causing the stopper to engage with the differential pressure-responding member during non-braking and normal braking condition and disengages the stopper from the differential pressure-responding member during anti-lock action so as to allow the latter to have forward motion.

2. The liquid pressure control device for anti-lock brake system as defined in claim 1, wherein the said differential pressure-responding member and the said liquid pressure control piston are integrated as one unit.

3. The liquid pressure control device for anti-lock brake system as defined in claim 1, wherein the gas pressure chamber is provided with a compression spring which returns the differential pressure-responding member.

4. The liquid pressure control device for anti-lock brake system as defined in claim 1, further comprising a pressure detecting device which inhibits the disengagement by the engagement control means of the differential pressure-responding member from the stopper, when a reduction in the gas pressure chamber is detected.

5. The liquid pressure control device for anti-lock brake system as defined in claim 1, wherein the on-off valve means is a spool valve moving in association with the stopper.

6. The liquid pressure control device for anti-lock brake system as defined in claim 1, wherein the engagement control means includes a linear motor supplied with power at the time of anti-lock action.

7. The liquid pressure control device for anti-lock brake system as defined in claim 1, comprising: a liquid pressure control cylinder, to which the liquid pressure control piston is movably arranged; a floating piston and a valve case which are movably arranged in the liquid pressure control cylinder; a first control valve which is arranged in the valve case and closed with the forward motion of the liquid pressure control piston; and a second control valve which is arranged behind the floating piston and closed with the forward motion of the floating piston.

8. The liquid pressure control device for anti-lock brake system as defined in claim 1, further comprising a liquid pressure control piston which is separate from the differential pressure-responding member; and a pin with a flange at one end, which is integrated as one unit with the differential pressure-responding member, which passes through the liquid pressure control piston and pushes the liquid pressure control piston in a forward direction.

* * * * *